US009177483B2

(12) United States Patent
Lin

(10) Patent No.: US 9,177,483 B2
(45) Date of Patent: Nov. 3, 2015

(54) GUIDING METHOD FOR AIRCRAFT DOCKING PROCESS

(71) Applicant: UNIBASE INFORMATION CORP., New Taipei (TW)

(72) Inventor: Cheng-Hsiang Lin, New Taipei (TW)

(73) Assignee: Unibase Information Corp., New Taipei (TW)

( * ) Notice: Subject to any disclaimer, the term of this patent is extended or adjusted under 35 U.S.C. 154(b) by 50 days.

(21) Appl. No.: 14/084,774

(22) Filed: Nov. 20, 2013

(65) Prior Publication Data

US 2015/0142218 A1 May 21, 2015

(51) Int. Cl.

| | |
|---|---|
| ***G01C 23/00*** | (2006.01) |
| ***G08G 5/06*** | (2006.01) |
| ***B64D 43/00*** | (2006.01) |

(52) U.S. Cl.

CPC ................ *G08G 5/065* (2013.01); *B64D 43/00* (2013.01)

(58) Field of Classification Search

CPC .................................. G08B 21/00; G08G 5/04

See application file for complete search history.

(56) References Cited

U.S. PATENT DOCUMENTS

| | | | | |
|---|---|---|---|---|
| 6,023,665 | A | 2/2000 | Millgard | |
| 6,563,432 | B1 * | 5/2003 | Millgård | 340/961 |
| 2003/0060998 | A1 * | 3/2003 | Millgard | 702/127 |
| 2004/0090348 | A1 * | 5/2004 | Hutton | 340/958 |

FOREIGN PATENT DOCUMENTS

| | | | |
|---|---|---|---|
| TW | 278141 | B | 6/1996 |
| TW | 200900658 | A | 1/2009 |

* cited by examiner

*Primary Examiner* — Helal A Algahaim
*Assistant Examiner* — Michael Fouche
(74) *Attorney, Agent, or Firm* — Rosenberg, Klein & Lee

(57) ABSTRACT

A guiding method for aircraft docking process, which is used to detect an aircraft when docking to a stop line along a J-line on apron, includes steps as followed. According to response distances of different positions from a laser scanner, a distance between the aircraft and the stop line and offset angle during the docking process are detected. To show the distance and offset angle on a data display panel as guiding reference when a pilot of the aircraft operates the aircraft. The guiding method further has a waiting stage, a positioning stage, and a distinguishing stage and a guiding stage.

14 Claims, 8 Drawing Sheets

GUIDING METHOD FOR AIRCRAFT DOCKING PROCESS

BACKGROUND OF THE INVENTION

1. Field of the Invention

The present disclosure relates to a guiding method for aircraft docking process; in particular, to a guiding method which detects an aircraft preparing to stop at a stop line along a J-line on an apron.

2. Description of Related Art

Prior methods of identifying aircrafts include sending and receiving laser pulses to sense different points across a range of distance (every 1 meter from 10 meters to 100 meters) and angles (every 0.1 degrees from minus 5 degrees to plus 5 degrees). A 100 by 100 distance chart is created, and is compared with stored aircraft shapes to identify the type of aircraft and accordingly guide said aircraft to the appropriate stop line.

However, regarding the abovementioned method of sending and receiving laser pulses, some of the laser detection equipment is no longer supported, and the processing details is overly complicated and unable to focus the system operation on the task of identification and guiding. Additionally, the abovementioned processing method requires building of distance charts containing large amount of data, and requires storage of aircraft shapes also containing large amounts of data for comparison. This results in large amount of data for processing and complicates the calculations.

Hence, the present inventor believes the above mentioned disadvantages can be overcome, and through devoted research combined with application of theory, finally proposes the present disclosure which has a reasonable design and effectively improves upon the above mentioned disadvantages.

SUMMARY OF THE INVENTION

The object of the present disclosure is to provide a guiding method for an aircraft docking process, fully implementing the capabilities of the new generation of laser detection equipment, assigning the task of laser processing completely to the laser scanner. The system only needs to use the distance data output by the laser scanner in configuration with the height of the aircraft nose, the height of the aircraft fuselage and the positions of the engines to accomplish simply the task of identifying the aircraft and guiding said aircraft to dock, greatly simplifying the complicated procedures of existing algorithms.

In order to achieve the aforementioned objects, according to an embodiment of the present disclosure, a guiding method for an aircraft docking process is provided for detecting an aircraft along a J-line on an apron and guiding said aircraft to dock at a stop line, including:

Providing a laser scanner for scanning the abovementioned aircraft;

Providing a stepper motor for driving the laser scanner to rotate along an x axis and a y axis;

Providing a data display panel for displaying essential data to the pilot;

Controlling the angle of the stepper motor to adjust the detecting position of the laser scanner;

According to distances reported at different detection positions by the laser scanner, detect the degree of offset angle and distance to the stop line of the aircraft;

Displaying the distance and offset angle on the display panel for the pilot to refer to;

Carrying out a waiting stage, waiting for the aircraft to enter the J-line, wherein when the scanning detection positions reporting predetermined heights and distance, the aircraft is detected;

Carrying out a positioning stage for determining whether the portion of the aircraft closest to the stop line has been identified, and when the portion of the aircraft closest to the stop line has been identified carry out the following step;

Carrying out an identification stage for identifying key physical portions of the aircraft, to verify that model of the aircraft matches the input model; and Carrying out a guiding stage for guiding the aircraft to dock at a predetermined position by providing a distance between the stop line and the portion of the aircraft closest to the stop line, and the offset angle of the aircraft from the stop line.

The present disclosure has the following advantages. The present disclosure uses outputting distances by the laser scanners in configuration with the height of the aircraft nose, the height of the aircraft fuselage and the positions of the engine to accomplish simply the task of identifying the aircraft and guiding the aircraft to dock, greatly simplifying the complicated procedures of existing algorithms.

In order to further the understanding regarding the present disclosure, the following embodiments are provided along with illustrations to facilitate the disclosure of the present disclosure.

DETAILED DESCRIPTION OF THE PREFERRED EMBODIMENTS

The aforementioned illustrations and following detailed descriptions are exemplary for the purpose of further explaining the scope of the present disclosure. Other objectives and advantages related to the present disclosure will be illustrated in the subsequent descriptions and appended drawings.

The present disclosure uses a laser scanner of a new model proposed by the inventor, and data obtained by a position correcting and offset angle processing method invented by the inventor to develop a guiding method for docking aircrafts. Using this guiding method, instant data on distance and angular orientation can be obtained throughout the docking process of an aircraft to a stop line, for identifying and guiding the aircraft to dock. The aircraft is not limited to airplanes. The following description uses airplanes as an example.

The guiding method of the present disclosure assumes that an airplane turns from a taxiway onto a J-line J (refer to FIG.

2). Almost all docking processes at airports use this convention. This docking process results in the following effects. A laser equipment for measuring distances can complete the identification and docking process of aircrafts. The detailed shapes of the aircrafts are not recorded, and only specific parameters such as the height of the aircraft nose, the height of the aircraft fuselage and the positions of the engines are recorded. Distance distributed tables requiring large amount of data are not required for identifying and guiding the aircraft. The present guiding method can be applied not only for docking aircrafts to a stop line, but also for docking similar objects.

Figure 1:
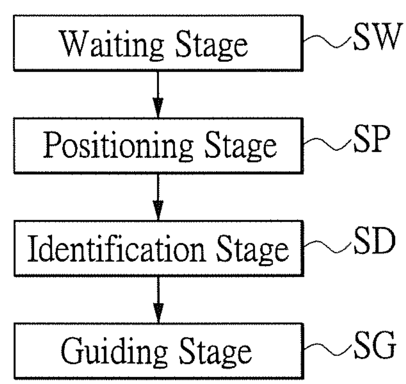
FIG. 1 shows a flowchart of steps according to the present disclosure.

The present guiding method is divided into several stages including a waiting stage, a positioning stage, an identification stage and a guiding stage. Each of the four stages has a common method for reading data by reading a set of a plurality (about nine to eleven in the present embodiment) of detection position arrays, reading distances detected at each position, and calculating corresponding heights. According to these data, the aircraft is identified and guided to docking. The order of the stages is shown in FIG. 1, a flowchart of steps according to the present disclosure, including a waiting stage (labeled as SW), a positioning stage (labeled as SP), an identification stage (labeled as SD) and a guiding stage (labeled as SG). The following describes each stage in more detail.

In each of the stages, the positions to be sampled are different, so the present disclosure describes the positions sampled for the different stages and the corresponding calculations for each. Before describing the stages, the present disclosure first describes the relationship between the measured distances and heights as follows. The laser scanner is placed on a known fixed position. The laser beam can be adjusted by a stepper motor along its horizontal (x-axis) and vertical (y-axis) direction. The laser equipment can be for example an ILM-500D product made by Measurement Devices Ltd (MDL) of Great Britain, but is not limited thereto. The equipment has a measuring range of 500 meters and can obtain 400 samples per second with a ±10 centimeters of accuracy. The motor can be for example a stepper motor of the ARM series made by Oriental Motor CO. LTD., but is not limited thereto. The motor can partition 360° into 10,000 steps, for a resolution of 0.036°/step, and in conjunction with 1:2 toothed belt and vertical (y-axis) reflecting mirror, the horizontal resolution can reach 0.018°/step and the y-axis resolution can reach 0.036°/step. Regarding the structural details of the abovementioned laser scanner, please refer to R.O.C Taiwan application number 102211977 "Aircraft Guiding System" by the present inventor.

Figure 2:
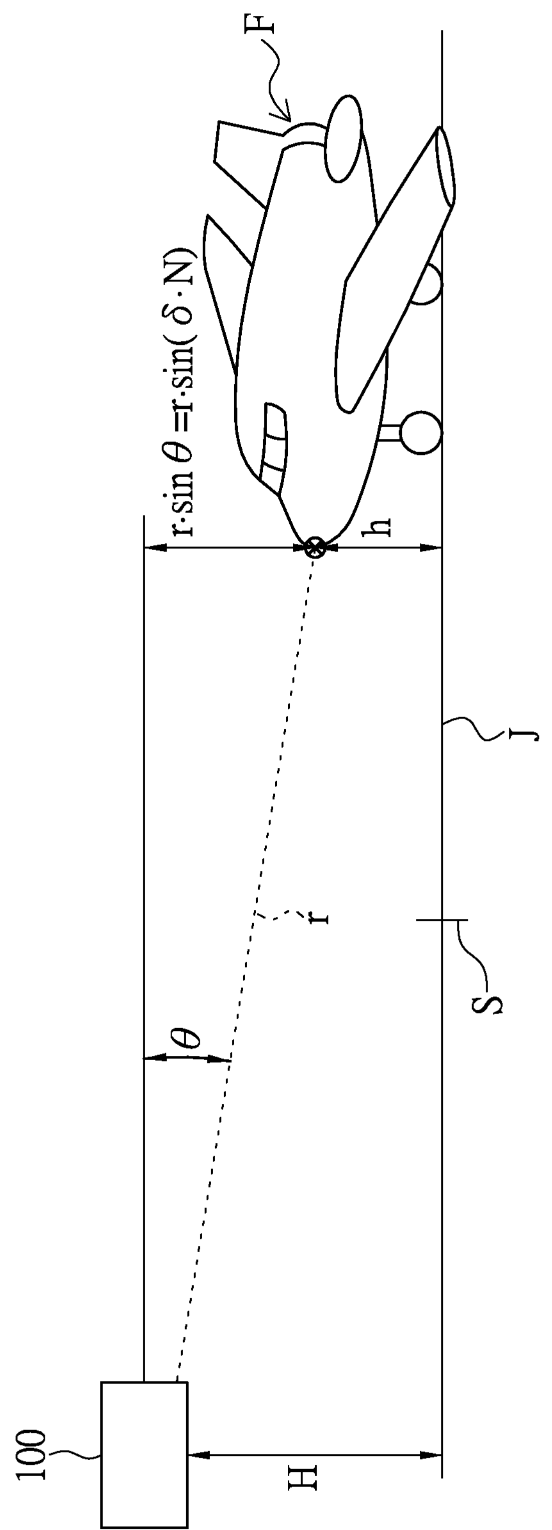
FIG. 2 shows a schematic diagram of using a laser scanner for detection according to the present disclosure.

FIG. 2 shows a schematic diagram of using a laser scanner 100 for detection according to the present disclosure.

$$h=H-r*\sin(\theta) \quad (1)$$

wherein H is the distance between the ground and the laser scanner 100, and is a constant which can be obtained after the laser scanner 100 has been fixed;

h is the height of the detected object, such as the height of the aircraft F according to the embodiment in FIG. 2;

θ is the angle of the laser beam relative to a horizontal line.

Assuming that the laser beam is kept at a level position respective to the y axis of the motor position, for each mark the y axis motor moves, the laser beam moves by an angle of:

$$\delta=(360°)/10000=0.036° \quad (2)$$

When the present embodiment is recording the measuring points, if the y axis motor moves N marks, the angle of inclination of the y axis laser beam is:

$$\theta=\delta*N \quad (3)$$

According to the reported distance r of the laser scanner 100, the height h of the detected object can be obtained by formula (1). In other words, the present disclosure can identify a distance r and a height h of a known angle. This conclusion serves as the basis for guiding of the present disclosure described hereafter.

The aircraft models on the current market are bilaterally symmetric. Taking advantage of this characteristic, when the detected aircraft moves left and right, the aircraft can be scanned at an angle to the left and an angle to the right having the same magnitude as the angle to the left, and after comparing the parameters obtained from the two sides the offset of the aircraft body can be identified. Additionally, in order to detect the position of certain equipment (such as engines), one side (the left side or the right side) can be detected to achieve the effect of measurement.

According to the above basis, the present disclosure develops the following aircraft docking process and guiding method described below.

[Stage One: Waiting Stage]

After the airplane lands, it turns from the taxiway onto a J-line J on an apron for docking at a stop line S, as shown in FIG. 2. The so-called waiting stage refers to the step of waiting for the aircraft to dock to the J-line J. In the waiting stage, the method of identification is shown in FIG. 3, which shows a flowchart of the waiting stage according to the present disclosure.

Figure 3:
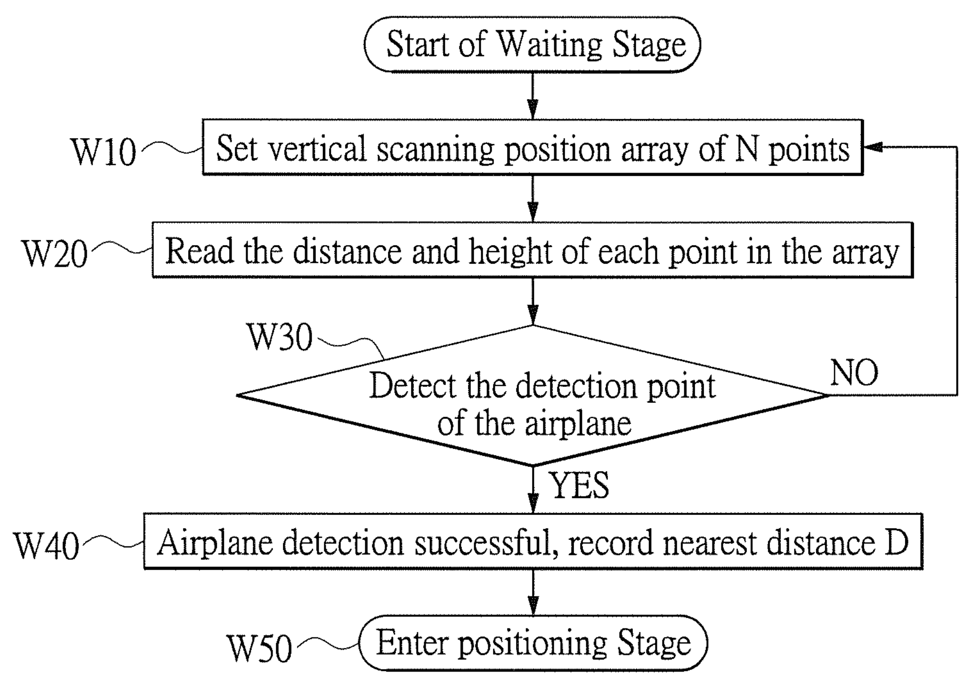
FIG. 3 shows a flowchart of the waiting stage according to the present disclosure.

As shown in FIG. 3, step W10 sets a vertical scanning position array of N points. The present disclosure first scans vertically to detect the airplane, because the airplane is readily detectable upon entering the J-line J. So the present embodiment sets different detection positions on the J-line J for reading at a plurality of points. The present embodiment uses 11 points, and a predetermined distance can be set as a midpoint of detection, with 6 detection points before and 4 detection points after, and the angle between consecutive scanning points is 24 steps turned by the motor. Next, step W20 reads the distances and heights of each of the points in the array. The predetermined distance is set according to the length of the J-line J of the airport, which is typically 100 meters. The entry way is approximately set at the 65 meter mark (predetermined length of the entry way). The position of reading the airplane is set at the height of the airplane nose. During guiding, the user needs to input the model of the airplane to verify the height of the airplane nose.

In typical guiding environments, the laser scanner 100 is installed at a height of approximately 7 meters. The range covered by scanning is approximately from the 30 meter mark to the 150 meter mark. So, any airplane that enters this region can be detected. Due to the large size of airplane bodies, they can be detected even when the incorrect models have been inputted.

Then, in step W30, identify whether the detection point of the airplane has been detected. The present embodiment compares the height h, also known as a "height comparison step." Since the laser equipment only reports the distance, even if the laser beam detects the ground of the apron a distance is likewise received. By calculating the height (as shown by h of FIG. 2), the detected object is identified as to whether it belongs to the airplane. Set the height of the ground as 0, and the airplane must have a specific height greater than 0. The present embodiment can use a minimum effective height inputted by a user to classify detected heights lower than the minimum effective height as not belonging to the airplane. Additionally, the present embodiment can include an "effective distance comparison step." By setting an maximum effective distance, which can be the length of the entry way, when the scanned distance exceeds the maximum effective distance, the scanned distance is deemed as ineffective. Given that the taxiway and the entry way have limited distances, overly long distances can be considered as ineffective distances.

When one of the 11 detection points detect an appropriate height and distance, an airplane is deemed to be detected and the positioning stage is carried out.

[Stage Two: Positioning Stage]

The object of the present stage is to locate the airplane nose. Typically, the airplane nose is positioned at the front end of the airplane, which is also the portion of the airplane closest to the stop line. In the guiding process, the distance shown on the data display panel is the distance from the airplane nose to the stop line. The basis for determining whether the airplane has an angular offset from the J-line is the offset of the airplane nose from the J-line. Therefore, it is important to locate the position of the airplane nose.

When the airplane slides from the taxiway onto the J-line, the airplane gradually rotates forward. When the airplane is detected by laser, the detected portion may be a portion of the aircraft and not necessarily the nose of the airplane. At this moment, the distance of the airplane can be known from the detected portion of the airplane. With this distance as the center, begin scanning the airplane in detail, as shown in FIG. 4, a flowchart of the positioning stage according to the present disclosure.

Figure 4:
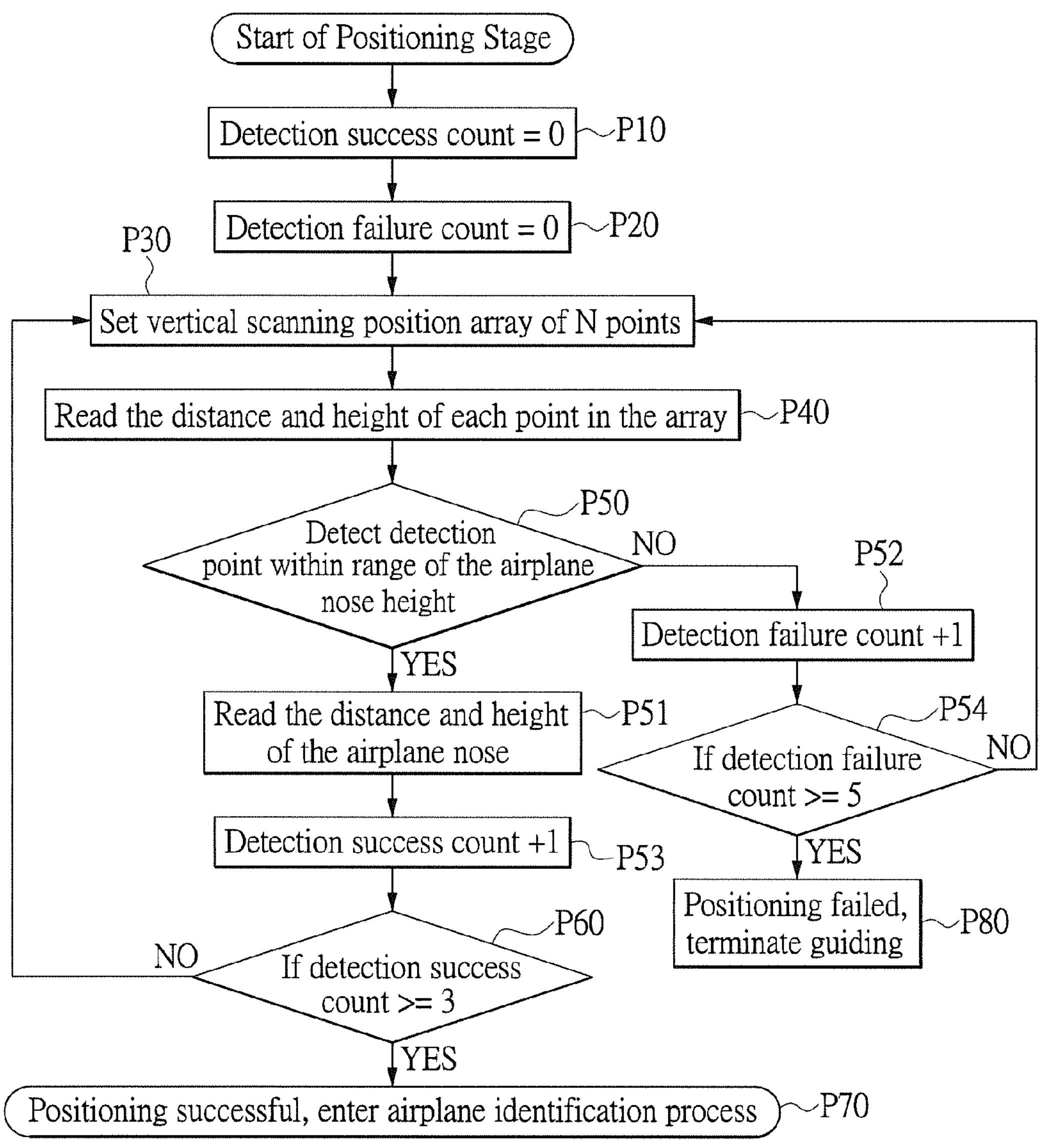
FIG. 4 shows a flowchart of the positioning stage according to the present disclosure.

In FIG. 4, first, as shown in step P10 and P20, set the detection success and detection failure counts to zero. Next, step P30 sets a vertical scanning position array of N points, beginning vertical scanning on the J-line. At this moment the airplane is roughly located, so the range of scanning can be reduced. In a preferred embodiment of the present disclosure, use 11 scanning points, and set the motor y axis distance between consecutive scanning points according to the distance of the airplane. When the airplane is more than 30 meters away set the distance between consecutive scanning points to 12 steps. When the airplane is less than 30 meters away set the distance between consecutive scanning points to 14 steps. For 11 scanning points, set 6 of the points behind and 4 of the points in front. As shown in step P40, read the distance and height for each of the points in the array. After scanning the 11 points, the respective distances and heights of the 11 points can be obtained. A method of using these scanning data to determine whether the airplane nose has been read is shown in FIG. 5, a flowchart of identifying the position of the aircraft nose according to the present disclosure.

Figure 5:
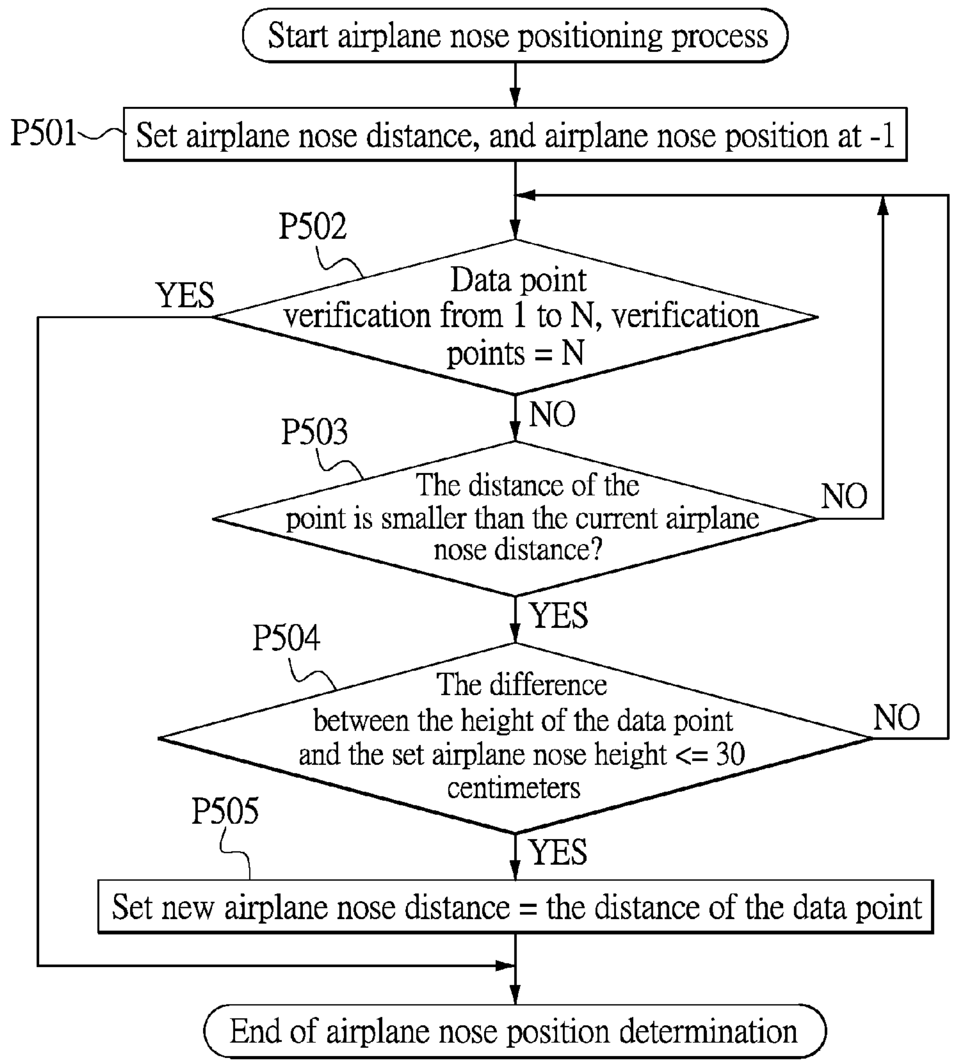
FIG. 5 shows a flowchart of identifying the position of the aircraft nose according to the present disclosure.

As shown in FIG. 5, before beginning, as shown in step P501, set the distance of the airplane nose, to be for example 500 meters, and set the airplane nose position at −1. The present embodiment successively checks the height of each point. Next, as shown in steps P502 and P503, data is checked from points 1 to N and determine whether the distances of the points are smaller than the current airplane nose distance. As shown in step P504, determine if the difference between the height of each data point and the set airplane nose height is smaller than a predetermined tolerant distance, for example 30 centimeters. If the difference between the height of the point and the height of the airplane nose is greater than 30 centimeters, then the point is not considered to be the position of the airplane nose, then return to step P502. The predetermined tolerant distance is set at 30 centimeters because the scanning resolution cannot necessarily scan the exact position of the airplane nose, and the airplane may not be completely level on the center line or the apron and be higher and some portions and lower at others, so the points of the scanning array do not necessarily scan the exact position of the airplane nose.

When the difference between the height h of the scanning point and the expected height of the airplane nose is less than 30 centimeters, the point is considered as a candidate position. Next proceed to step P505, set the new airplane nose distance as the scanned distance, and set the airplane nose position to be equal to this position. Among all the candidate positions, the nearest point is the airplane nose position that we want.

Return to steps P51 and P53 of FIG. 4, read the distance and height of the airplane nose, and add 1 to the detection success count, repeat the above vertical scanning process, as shown in step P60. If the airplane nose is successfully identified on three consecutive tries, then the airplane is successfully positioned, prepare to enter the next step (as shown in step P70). However, if during scanning the airplane nose cannot be identified, enter step P52 and add 1 to the detection failure count, signifying that the airplane may not have turned frontward and scanning process needs to be repeated. On the next vertical scanning, out of the points scanned having legitimate heights, the nearest point is taken as the basis of reference for the next scanning.

According to step P54, if the detection failure count reaches a predetermined number (for example five) and the airplane nose position is still not identified, then the airplane model may be input incorrectly. Stop signal must be displayed as shown in step P80, the positioning has failed, stop computer guiding, and use human guiding.

[Stage Three: Identification Stage]

When the airplane has been positioned, begin tracking the motion of the airplane while processing identification. Airplane identification process checks whether the model of the airplane to be guided is the same as the model input by the operator.

Given that different airplanes have different features, the docking positions are different. If the operator inputs the incorrect model such that the guiding system guides the airplane to an incorrect stop line, collisions may happen. So the identification process is a safeguard against human errors.

The airplane identification of the present disclosure targets specific outward features of the airplane. For a specific airplane model, the outward feature is a fixed parameter. For example, the airplane nose height, airplane fuselage height, airplane fuselage length, wingspan, number of engines on each side, the vertical and horizontal distances between the first engine and the airplane nose, the engine height and engine diameter, etc. Of these specific features, the present embodiment uses the airplane nose height and the characteristics of the first engine as the main basis for identification. The airplane fuselage height is a supplemental feature.

Regarding the selection of features for the present disclosure, the following considerations are taken into account. First, convenience: the convenience and essentialness of the reading. For example regarding the detection of the airplane nose during the guiding process, as soon as the airplane has been positioned, the airplane nose position needs to be tracked continually for controlling the distance between the stop line and the airplane and the lateral offset distance of the airplane. At this moment, the actual airplane nose height is continually being controlled. So the data of the airplane nose height is continually saved. Second, independence: the airplane nose height alone is not enough to confirm the airplane model. For example, A330, A340 and B777 (A means Airbus and B means Boeing) have similar airplane nose heights. Given a margin of error of 30 centimeters, these three models are indistinguishable from each other. Moreover, A330 and its sub models A330-200 and A330-300 have almost identical airplane heads. In other words their airplane nose heights are completely the same, so from a theoretical perspective airplane nose height is not enough to completely identify the airplane model.

Of course, for certain airports, the airplane models in use may be limited, such that airplane nose height alone is sufficient for identifying airplane models. In this case, the airplane nose height can be used as the only feature for identification to save time and increase guiding efficiency.

The present disclosure further selects other parameters for identification when airplanes being identified include airplanes of similar models or different sub models of the same models. First, the present embodiment selects the position of the engine for further comparison. Airplanes of similar models or of different sub models basically have different positions of the first engine. The vertical distance of the engine is usually related to the airplane fuselage length. The airplane nose height and the engine position together are sufficient to identify almost all the airplane models on the current market.

Even if similar airplane models in the future have a similar airplane nose height and a similar engine position such that the similar airplane models cannot be distinguished, it is very likely the new airplane has similar airplane fuselage features and length as the old model, and uses the same stop line. For guiding process, if the same stop line is to be used, the guiding process is almost completely the same. In other words, the similar models can be treated as the same model.

Figure 6:
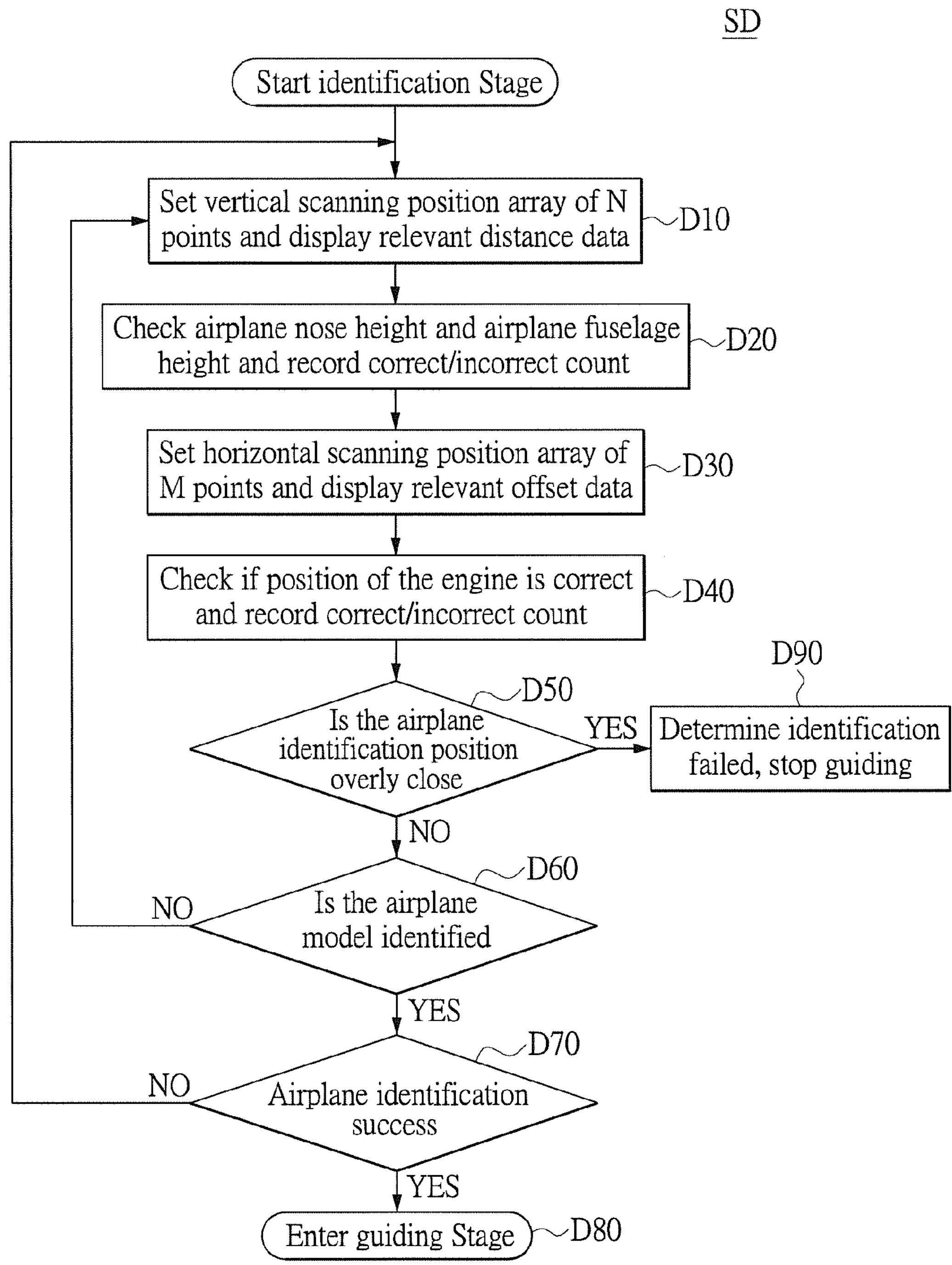
FIG. 6 shows a flowchart of identifying the model of the aircraft according to the present disclosure.

FIG. 6 shows a flowchart of identifying the model of the aircraft according to the present disclosure. The present embodiment first carries out a vertical reading process, method of which is similar to that of the positioning stage. As shown in step D10, set vertical scanning position array of N points and display relevant distance data. Based on the data read from the vertical array, data on the airplane nose distance, airplane nose height and airplane fuselage height can be obtained. The airplane nose distance can be used to display the current airplane distance. The airplane nose height and the airplane fuselage height can be checked to see if they are within reasonable ranges. The checking results are recorded as shown in step D20. Namely the detection success and failure counts of the airplane nose height and the airplane fuselage height are recorded. The largest read airplane fuselage height can be selected as the airplane fuselage height. However when the airplane fuselage height is greater than the height of the laser scanner, usually only the height of the laser scanner can be read.

After vertical scanning, carry out a horizontal scanning as shown in step D30. Set a horizontal scanning position array of M points and display relevant offset data. Even though the horizontal scanning is not directly related to the airplane identification, it can provide information on offset and distance of the airplane, providing guiding display. The principle of motion for the horizontal scanning is detailed in the following stage. Under the concept of the present disclosure, the guiding process needs to must prioritize the identification process. So the present embodiment conducts many guiding works during the identification stage such that the guiding process is not affected.

Figure 7:
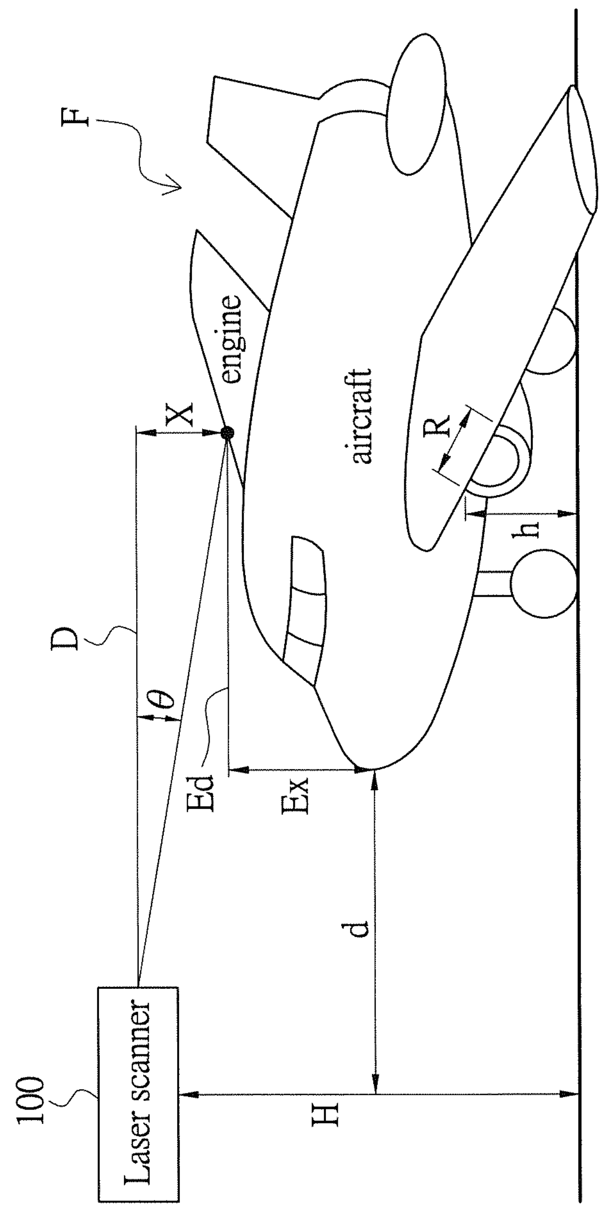
FIG. 7 shows a schematic diagram of identifying the position of the aircraft engine according to the present disclosure.

When the horizontal scanning is complete and the display is complete, an empty file can be used to carry out an engine detection process to confirm whether the engine position is correct. As shown in step D40, check whether the engine position is correct and record the detection success and detection failure counts. The engine detection process can use the following formulas to calculate expected angles and positions, and direct the laser beam to the appropriate direction to see if the engine can be read for basis of reference. FIG. 7 shows a schematic diagram of identifying the position of the aircraft engine according to the present disclosure.

The description of the relevant parameters of FIG. 7 are described as follows:

$$D=d+Ed \tag{4}$$

$$X=Ex \tag{5}$$

$$\delta=a\tan((H-h)/D) \tag{6}$$

$$\theta=a\tan(X/D) \tag{7}$$

In the above formulas, the D of formula (4) represents the vertical distance between the engine and the laser scanner; d represents the vertical distance between the airplane nose and the laser scanner; and Ed represents the vertical distance between the airplane nose and the engine.

In formula (5), X represent the horizontal distance between the engine and the laser scanner; and Ex represents the horizontal distance between the airplane nose and the engine.

In formula (6), δ represents the angle of inclination of the laser beam relative to the vertical direction; H represents the height of the laser scanner; and h represents the height of the engine.

In formula (7), θ represents the horizontal offset angle of the laser beam. According to the above angular positions, the present embodiment selects 9 scanning points, wherein the y axis position is calculated by the formulas, the x axis is calculated by the formulas added outward, each one of the steps of increment is:

$$\sigma=(a\tan(k*R/D))/N \tag{8}$$

σ represents the increased angle of each step, k is an adjustment coefficient having a value of 1, R is the diameter of the engine, D is defined as in formula (4), and N is the sample scanning size.

Given that the airplane continues to move forward during the scanning process, the present formula extends from the center of the engine outward by a horizontal distance of an engine diameter R. Basically, the airplane is allowed to move under a certain speed and the engine can still be detected. If the airplane moves too fast, the coefficient k can be increased accordingly.

In reading the above array of numbers, the present embodiment can read data on corresponding distances and heights. Read distance between [D−40, D+10] (dm) are reasonable values. Given that the airplane continues to move forward during the reading process, the read distance is smaller than D, but since the engine is not a solid target, engine wall position may be read so the read distance is greater than D.

The value of read engine height between [h−1, h+1] (dm) is within a reasonable margin of error. In the present embodiment, the D and h are measured in decimeters. In a set of 9 read numbers, if one of the points reads the engine, the position of the engine is considered to exist.

Step D60 determines whether the airplane has been identified. Regarding the determination method, the detection success count and the detection failure count of the airplane nose height can serve as a basis. A similar concept can be applied to the reading of the engine. In consideration of practical operation, the detection success count required for successful reading can be 3 and the detection failure count required for failed reading can be 5. The choice of counts can be decided according to the length of the J-line and the amount of time allowed for airplane identification. If one of the targets of identification has failed, then the identification is considered to have failed. If the airplane identification has failed, return to step D10.

Some airports have uneven aprons or J-lines. The airplanes must be within a certain distance to be suitable for airplane nose or engine detection. In this case, add a distance requirement to the above detection. The airplane must be within a certain distance to begin identification.

Additionally, in order to avoid incorrect identification leading to dangerous docking, the present embodiment needs to completely identify within a certain distance. Otherwise the identification is considered to have failed. As shown in step D50 of FIG. 6, prior to step D60, the present embodiment adds a determination of whether the airplane model identification position is too close. If it is, then proceed to step D90, determine the identification as failed, stop guiding, stop computer guiding process, and turn to human guiding method. Usually the smallest identification distance is chosen around 12 meters in a preferred embodiment, facilitating the following human guiding to have sufficient space to operate. If the airplane identification position is not overly close and is within a safe distance for continuing identification, then proceed to step D60 and determine whether the airplane model is identified.

[Stage Four: Guiding Stage]

After the airplane has been successfully identified, the following object is to guide the airplane to the expected docking position. This is referred to as the guiding stage. In this stage, the system mainly provided the pilot data on distance and offset. Distance data refer to the distance between the airplane nose and the stop line, so that the pilot can control the speed and position of the airplane. Offset refers to the offset of the airplane from the J-line. When the offset distance reaches a predetermined extent of warning, the data display panel advises the pilot to fix the offset in order to satisfy object of docking at the correct position.

Figure 8:
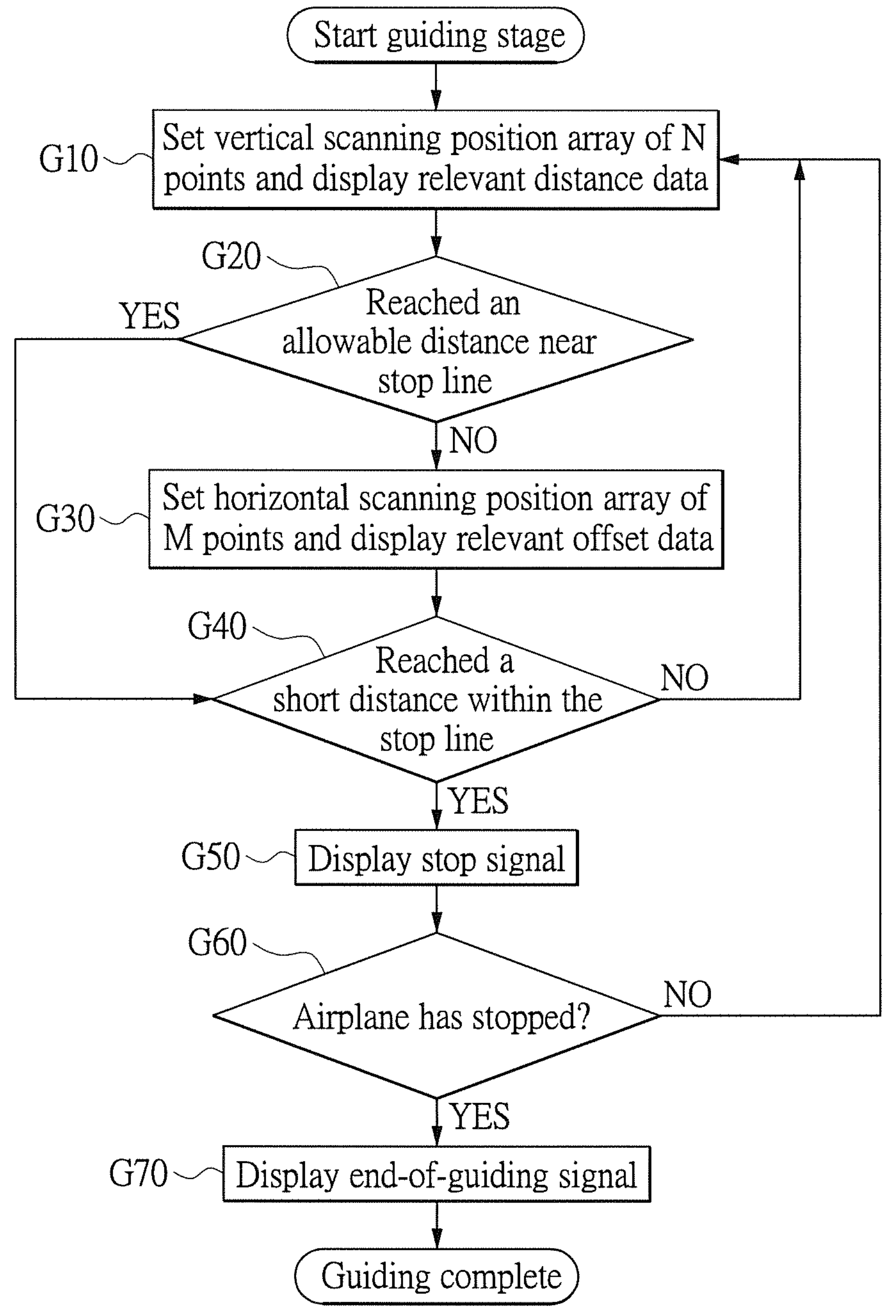
FIG. 8 shows a flowchart of the guiding stage according to the present disclosure.

FIG. 8 shows a flowchart of the guiding stage according to the present disclosure. In FIG. 8, the system first executes a vertical scanning process. As shown in step G10, set a vertical scanning position array of N points and display relevant distance data. Scanning method is generally similar to that of the positioning stage (SP), and uses a vertical scanning method having about 11 points. The midpoint of scanning is set at the position of the airplane, scanning 4 points in front and 6 points behind. According to data reported by these 11 points, the airplane nose position can be controlled and according the distance data is displayed.

As shown in step G20, after each vertical scanning, determine whether the airplane has reached an allowable distance within the stop line. Before the airplane reaches a specific distance (usually set as 3 meters before the stop line), carry out a horizontal scanning as shown in step G30. Set a horizontal scanning position array of M points and display relevant offset data. The horizontal scanning generally can select 11 scanning positions. The vertical direction selects the airplane nose position as the midpoint. The horizontal direction selects 5 points on each side in a bilaterally symmetrical manner. The scanning width is set as two times the airplane nose width. The airplane nose width starts from the center of the airplane nose, and selects an extension point on each of the left and right sides. The difference between the distance from any one of the extension points to the laser scanner and the distance from the airplane nose to the laser scanner is less than 30 centimeters. The formula for selecting point is as follows:

$$\beta=a\tan(W*2/D)/N \qquad (9)$$

In formula (9), β refers to angle between two neighboring points in the horizontal points. W refers to the width of the airplane nose. D refers to the distance between the airplane nose and the laser scanner. N refers to the sample size, basically 11.

According to the above formula, taking 5 detection points each from the left and right of the J-line obtains the distance and height data of N points. Regarding these points, take the nearest distance, namely the new distance between the airplane nose and the laser scanner, for renewing of distance display.

The calculation of the offset angle or distance is calculated by the following method in the present embodiment:

Search for a starting point, namely start selecting for point 0. The distance of that point is within 30 centimeters of the nearest distance D. Assume the position of the point to be Hfst. Using a similar concept, search the last point, namely selecting from point N−1 downward. The distance of that point is within 30 centimeters of the nearest distance D. Assume the position of the point to be Hend. According to the above method, after obtaining Hfst and Hend, the offset angle and offset distance can be calculated by the following formulas:

$$n=((N-1)-H\mathrm{end}-H\mathrm{fst})/2 \qquad (10)$$

$$\gamma=|n|*\beta \qquad (11)$$

$$d=D*\tan(\gamma) \qquad (12)$$

In the above formulas, in formula (10) N refers to the sample size. "n" is interval number of offset. The sign of "n" represents left and right offsets. In formula (11) "γ" refers to the offset angle. Take the absolute value of n. In formula (12) "d" refers to the absolute value of the offset distance, and D is the distance between the airplane nose and the laser scanner.

When offset amount γ is greater than a predetermined alarm level, the system displays an offset warning message according to the left and right direction.

Through continual exchange of vertical scanning and horizontal scanning, the effect of timely updating distance from the stop line and offset display is achieved, achieving the object of correct guiding.

When the airplane is at a specific short distance away from the stop line (usually 3 meters), namely the "yes" condition of step 20, the speed of the airplane is usually very low and lateral movement is difficult, so the system can target only vertical scanning, providing only distance data.

As shown in step G40, given that that step 20 gives a "yes" condition, further determine if the airplane is within a short distance of the stop line. The concept lies in, when the airplane is very close to the stop line, such as 20 centimeters or so, as shown in step G50, the system can display a stop signal, to notify the airplane to stop. The airplane may not be able to immediately stop, so step G60 is added to determine whether the airplane has already stopped. When the airplane has stopped, after scanning detections, if the airplane is found to have stopped, then as step G70 shows, display an end-of-guiding signal, finishing the guiding process.

The special feature and function of the present disclosure lies in fully using new generation laser distance detecting equipment, completely assigning the laser processing work to the laser scanner. The system only needs to use the distance output by the laser scanner in conjunction with the airplane nose height, the airplane fuselage height and the engine positions of each airplane models to simply achieve the core functions of guiding an airplane to dock and airplane model identification, greatly simplifying complicated process of existing calculations.

The descriptions illustrated supra set forth simply the preferred embodiments of the present disclosure; however, the characteristics of the present disclosure are by no means restricted thereto. All changes, alternations, or modifications conveniently considered by those skilled in the art are deemed to be encompassed within the scope of the present disclosure delineated by the following claims.

What is claimed is:

1. A guiding method for an aircraft docking process, for detecting an aircraft along a J-line of an apron ready to dock at a stop line, comprising:

providing a laser scanner for scanning the aircraft;

providing a stepper motor for driving the laser scanner to rotate with respect to the x axis and the y axis;

providing a data display panel, for displaying signals to a pilot;

controlling the orientation of the stepper motor for adjusting a detection position of the laser scanner;

based on the distances reported from different positions scanned by the laser scanner, detecting the distance between the aircraft and the stop line and the offset angle of the aircraft;

displaying said distance and offset data on the data display panel for providing the pilot reference when operating the aircraft;

conducting a waiting stage, waiting for the aircraft to enter J-line, wherein the scanning detection points reporting predetermined heights and distances are considered to be points whereat the aircraft has been detected;

conducting a positioning stage, determining whether the portion of the aircraft closest to the stop line has been located, and when the portion of the aircraft closest to the stop line has been located entering the next stage, wherein the portion of the aircraft closest to the stop line is an airplane nose; wherein the positioning stage includes:

vertically scanning along the direction of the J-line;

setting a predetermined number of vertical scanning points;

successively checking the height positions of each scanning points;

when the difference between the height of each scanning point and the airplane nose height is greater than a predetermined allowable distance, considering the scanning point to not be the position of the airplane nose; when the difference between the height of each scanning point and the airplane nose height is smaller than a predetermined allowable distance, considering the scanning point to be the position of the airplane nose; and repeating the vertical scanning process, if the airplane nose is identified on three consecutive tries, the aircraft is successively positioned and prepared to enter the identification stage;

wherein the step of setting the number of vertical scanning points is set according to the distance of the aircraft away from the stop line, when the aircraft is more than 30 meters away from the stop line, setting the distance between consecutive scanning points to 12 steps;

when the aircraft is less than 30 meters away from the stop line, setting the distance between consecutive scanning points to 14 steps; for 11 scanning points, set 6 scanning points behind the airplane nose and 4 scanning points ahead of the airplane nose;

conducting an identification stage, regarding the physical features of the aircraft, identify a plurality of features to verify that the aircraft model is consistent with the aircraft model inputted; and conducting a guiding stage, through providing the distance between the portion of the aircraft closest to the stop line and the stop line, and the offset data of the aircraft offset from the J-line, guiding the aircraft to a predetermined docking position.

2. The guiding method for an aircraft docking process according to claim 1, wherein a step of obtaining the distance and the height of the detection point of a known angle includes:

according to steps of rotation of the stepper motor, assuming the amount of steps of rotation to be N, obtaining the angle of motion $\delta$ of the laser beam corresponding to movement of one step of rotation;

obtaining the angle of inclination $\theta$ of the laser beam along the y axis, wherein $\theta=\delta*N$;

obtaining the distance r reported by the laser scanner;

according to the following formula, obtaining the height of the detected point;

$h = H - r * \sin(\theta)$;

wherein H is the height of the laser scanner relative to the ground.

3. The guiding method for an aircraft docking process according to claim 1, wherein the waiting stage includes a step of comparing heights, for determining whether the aircraft is positioned at the predetermined height, and the step of comparing heights includes:

setting the height of the ground to be zero;

setting a parameter of minimum effective height for the aircraft;

when the detected height is smaller than the minimum effective height, considering the aircraft to be not detected.

4. The guiding method for an aircraft docking process according to claim 2, wherein the waiting stage further includes a step of comparing effective distance, for determining whether the aircraft is positioned within the effective distance, and the step of comparing effective distance includes:

setting a maximum effective distance;

considering the scanned distance ineffective is the scanned distance is greater than the maximum effective distance.

5. The guiding method for an aircraft docking process according to claim 3, wherein the maximum effective distance is a predetermined length of an entry way.

6. The guiding method for an aircraft docking process according to claim 1, wherein the predetermined allowable distance is 30 centimeters.

7. The guiding method for an aircraft docking process according to claim 1, further comprising setting a predetermined detection failure count of greater than 1, wherein when the airplane nose cannot be detected display a stop signal and stop computer guiding.

8. The guiding method for aircraft docking process according to claim 1, wherein in the identification stage, the features include airplane nose height, airplane fuselage height, the vertical and horizontal distances between the first engine and the airplane nose, the height between the engine and the ground, and the diameter of the engine.

9. The guiding method for an aircraft docking process according to claim 8, wherein the features used as basis for identification are the airplane nose height and the first engine, and the airplane fuselage height is a supplemental feature.

10. The guiding method for an aircraft docking process according to claim 1, wherein the guiding stage includes:

executing a vertical scanning process, through vertical scanning, scan a plurality of points, wherein the midpoint of scanning is at the position of the airplane nose of the aircraft; and after each vertical scanning, executing a horizontal scanning before the aircraft reaches a predetermined distance within the stop line.

11. The guiding method for an aircraft docking process according to claim 10, wherein the step of horizontal scanning includes:

scanning a plurality of points bilaterally symmetrically on the left and right along a horizontal direction; and setting a scanning width to be twice the width of the airplane nose of the aircraft, wherein the width of the airplane nose is calculated from the center of the airplane nose and selecting two extension points on two respective sides thereof; wherein the difference between the distance from any one of the extension points to the laser scanner and the distance from the airplane nose to the laser scanner is less than 30 centimeters.

12. The guiding method for an aircraft docking process according to claim 10, wherein the formula for obtaining the scanning points is as follows:

$$\beta = a\tan(W*2/D)/N;$$

β is the angle between two neighboring points of the horizontal points, W is the width of the airplane nose; D is the distance between the airplane nose and the laser scanner; and N is the sample size, basically 11.

13. The guiding method for an aircraft docking process according to claim 10, wherein the calculation of the offset angle or the offset distance includes the following steps:

obtaining the starting point, namely selecting from position 0, the distance of the point is within 30 centimeters of the closest distance D, assume the position of the point to be Hfst;

obtaining the last point, namely selecting from point N-1 downward, he distance of the point is within 30 centimeters of the nearest distance D, assume the position of the point to be Hend;

after obtaining Hfst and Hend, calculate the offset angle and offset distance, by the following formulas:

$$n=((N-1)-Hend-Hfst)/2 \quad (10)$$

$$\gamma=|n|*\beta \quad (11)$$

$$d=D*\tan(\gamma) \quad (12)$$

N refers to the sample size, n is interval number of offset, the sign of n represents left and right offsets, in formula (11) γ refers to the offset angle, take the absolute value of n, in formula (12) d refers to the absolute value of the offset distance, and D is the distance between the airplane nose and the laser scanner;

wherein when offset amount γ is greater than a predetermined alarm level, the system displays an offset warning message according to the left and right direction.

14. The guiding method for an aircraft docking process according to claim 13, wherein when the aircraft reaches a predetermined closest distance to the stop line, display a stop signal to notify the aircraft to stop; and after the aircraft has stopped, after several scanning detections, when the aircraft is detected to have stopped, display an end-of-guiding signal, finishing the guiding method.

* * * * *